2,980,497

RECOVERY OF LITHIUM FROM LITHIUM ALUMINATE COMPLEX

Robert D. Goodenough and Vernon A. Stenger, Midland, Mich., assignors to The Dow Chemical Company, Midland, Mich., a corporation of Delaware No Drawing. Filed Jan. 29, 1957, Ser. No. 636,869

4 Claims. (Cl. 23—25)

This invention relates to a process for recovery of lithium from a lithium aluminate complex, and more particularly, to the recovery of lithium by hydrothermal digestion of a lithium aluminate complex and the concentration of the resulting lithium chloride solution by use of an ion exchange resin.

Recent technological developments have created a considerable demand for lithium. Heretofore, lithium has been recovered from natural minerals, such as spodumene, lepidolite, amblygonite, and others, and from natural brines of the sulfate type. There is available a large supply of natural brines of the chloride type which contain a small but significant amount of lithium but which have not been used as a source for lithium. In a copending application Serial Number 636,953, filed same day as instant application, in the name of one of the co-inventors of the instant application, there is described a process whereby lithium may be recovered from these chloride brines and other solutions as a lithium aluminate complex. The present art for recovery of lithium from the lithium aluminate complex involves dissolving the complex with the aid of an acid, titrating the resulting solution with a basic compound to precipitate the aluminum from the solution as an aluminum hydroxide, and then recovering the lithium from the remaining solution. This process requires the use of acid and alkali and is expensive. It is desirable to have a more economical method for the recovery of the lithium from the complex so that the use of the large available supply of lithium bearing brines as sources for lithium would be more economically attractive.

It is, therefore, a principal object of this invention to provide an economical process for recovery of lithium from lithium aluminate complex. It is a further object to provide a process in which relatively pure solutions of lithium may be obtained.

It has been discovered that the above and additional objects may be accomplished by the process of the present invention, which comprises heating a lithium aluminate complex to a temperature of at least 75° C. in the presence of water to decompose the complex to a soluble lithium compound and aluminum hydroxide. Sufficient pressure is used to maintain the water in liquid phase. The lithium recovered by this process will be in a relatively dilute solution. This solution may then be concentrated or converted to lithium hydroxide by contacting the solution with an ion exchange resin. By this process over 90 percent of the lithium in the complex may be recovered as a lithium solution containing around 6 percent by weight of lithium hydroxide or a lithium salt.

The term "lithium aluminate complex," as used herein, means the hydrated lithium aluminate composition which precipitates upon intermixing a soluble aluminum salt with a lithium chloride or lithium nitrate solution under neutral or slightly alkaline conditions at a temperature in the range of 20° to 100° C. The actual composition of this precipitate is not known, but it contains lithium and aluminum in atomic ratio of 1 Li: 2–3.5 Al. X-ray diffraction analysis of the complex shows a previously unreported crystal structure and a slight excess of aluminum hydroxide in the bayerite form. These complexes may be obtained from relatively pure solutions of lithium and also from solutions which contain a high concentration of water-soluble salts other than lithium salts by the method described in above cited patent application.

To decompose the lithium aluminate complex, it is essential that the precipitate be heated in the presence of liquid water and preferably in the presence of a neutral salt supplying anions which will react with lithium to form a soluble lithium salt, such as calcium chloride, calcium nitrate, sodium chloride, and sodium nitrate. When a sufficient amount of the anions is present to react with the lithium freed by the decomposition of the complex, the percent recovery of the lithium is approximately twice the recovery obtained without the presence of these anions. The amount of water used should be such that it will dissolve the lithium compound formed by the decomposition of the lithium aluminate complex. In the processes where the lithium is recovered from lithium solutions by the precipitation of the lithium aluminate complex as described in the cited patent application, a filter cake containing from 9 to 15 percent solids and the remainder water is generally obtained. This filter cake also generally has sufficient salts occluded so that it may be used directly in the hydrothermal digestion without any further addition of water or of the neutral salt. Where the lithium aluminate complex is in a dry form, water is added to provide a slurry containing at least 50 percent water. An excessive amount of water, while not detrimental to the decomposition of the aluminate, is undesirable as a more dilute solution of lithium chloride is obtained.

Although the temperature of the hydrothermal digestion can be as low as 75° C., a considerably higher recovery of the lithium from the complex is obtained at temperatures of 100° C. and above. It is preferred to use a temperature in the range of 120° to 130° C. Much higher temperatures may be used, but it is undesirable to go above 155° C. At temperatures below 155° C., the aluminum hydroxide obtained is in the form of bayerite. In this form, the hydroxide is relatively reactive and thus may be recovered, converted to $$AlCl_3 \cdot 6H_2O$$

or to $NaAlO_2$, and used as a reactant for the precipitation of lithium from the brines. At temperatures above 155° C., the aluminum hydroxide obtained is in the boehmite form which is relatively inactive and thus difficult to convert and reuse.

The solutions of lithium obtained in the hydrothermal digestion are relatively dilute and will contain numerous impurities. A typical analysis of the solution obtained from a lithium aluminate complex precipitated from a chloride brine is given below in weight percent:

| | |
|---|---|
| LiCl | 0.38 |
| Ca | 0.02 |
| Mg, Na, K, Sr | 0.01 |
| Cl | 0.38 |
| B | 0.005 |
| Al _____parts per million__ | 0.8 |
| Fe _____do____ | 0.07 |

This solution is too dilute to be used for many of the lithium applications. The solutions could be concentrated by evaporation but the costs are high and the concentration of the impurities would likewise be increased. Thus, purification and concentration of the solution by ion exchange resins are preferred.

In concentrating the lithium solution, the preferred procedure comprises contacting the solution with a strongly acidic cation exchange resin in either the sodium or the hydrogen form. Lithium solution is passed through the resin and the lithium is bound to the resin by displacing the hydrogen ion or the sodium ion on the resin. The amount of resin required will depend upon the concentration of the solution. With the more concentrated solutions, there are more ions in a given volume of solution, and thus more resin is required. When the ion exchange resin has been sufficiently exhausted or where the active ions have been sufficiently replaced by lithium or with some of the impurities in the solution, the lithium may be eluted from the ion exchange resin as lithium hydroxide by adding a sodium hydroxide solution containing from 1 to 20 weight percent caustic to replace the lithium ion from the resin. The amount of hydroxide solution used must be sufficient to replace or to convert the ion exchange resin to the sodium form. Generally, a slight excess is preferred. It is undesirable to use a large quantity of the caustic, since the lithium hydroxide recovered will be partially contaminated with the caustic. When sufficient amount of caustic is used or a slight excess, the lithium hydroxide is obtained in the effluent from the resin bed without an excessive amount of caustic. If it is desirable, lithium may also be eluted from the ion exchange resin in the form of lithium chloride by contacting or passing dilute hydrochloric acid through the resin. Likewise, other soluble salts of lithium may be produced, such as bromide, iodide, nitrate, and acetate, by using the corresponding acid or salt.

The purification of the lithium solution is obtained by the preferential displacement of the ions on the cation exchange resin. The main impurity in the solutions obtained in hydrothermal digestion is calcium. When the solution is passed through the cation exchange resin, the lithium with calcium, aluminum, magnesium, and ferric ions are bound to the resin while the other ions pass through the bed. Upon elution with NaOH, soluble lithium hydroxide is obtained which passes through the bed. The calcium, magnesium, aluminum, and ferric ions which have been bound to the cation resins will be converted to insoluble hydroxides and will remain suspended in the bed. These hydroxides may be removed by back washing the bed with sodium chloride. If the bed is eluted with an acid to obtain a soluble lithium salt, the lithium is preferentially eluted from the bed and thus concentration and purification of the lithium obtained.

The cation exchange resins which are applicable to the concentration of the lithium solution are, preferably, the strongly acidic cation exchange resins, such as the sulfonic type disclosed in U.S. Patents Numbers 2,597,438, 2,500,149, and 2,366,007, but other cation exchange resins, such as described in U.S. Patent Number 2,471,818, may be used.

If it is desirable merely to purify the hydrothermal digestion solution and to convert the lithium chloride to lithium hydroxide, the solution may be passed directly into contact with a strongly basic anion exchange resin, such as the quaternary ammonium type resins disclosed in U.S. Patents Numbers 2,591,571, 2,614,099, 2,597,494, and 2,597,440 in the hydroxyl form. When the solution is passed through the resin, the lithium chloride will be converted to lithium hydroxide and pass through the bed. Any calcium, magnesium, aluminum, and ferric ions will be converted to insoluble hydroxides and will remain suspended near the top of the bed.

The temperature and pressure under which the dilute solutions are contacted with the ion exchange resins and the elution of the lithium from the exchange resins are not critical. The conditions employed are governed by the limiting factor of the ion exchange resins. Generally temperatures from 5° to 95° C. are used and atmospheric pressure employed.

It is evident to a person skilled in the art that the dilute solution may be contacted with the ion exchange resins in either a batch process or a continuous process. It is also possible to use a multiplicity of resin beds. Thus in the operation one bed may be contacted with a dilute solution and be used for the recovery of lithium while the other bed or beds may be contacted with sodium hydroxide or an acid to free the lithium or be in the process of reactivition. Thus, it is possible by switching the beds to continuously recover the lithium.

The following examples further illustrate the invention but are not to be construed as limiting the invention thereto.

Example I

To a bomb, 17.4 gm. of lithium aluminate complex filter cake was added. The filter cake was obtained by the precipitation of lithium aluminate complex from a natural chloride brine. It contained 9.5 weight percent solids and the remainder water. The cake contained 0.82 weight percent lithium chloride and a total chloride ion concentration of 1.23 weight percent. The bomb was placed in an oil bath where it was heated to a temperature of 128° to 130° C. for 1 hour. After the end of the digestion period, the bomb was quenched with water, and the contents removed with the air of 50 to 75 ml. of water. The slurry obtained was heated to near boiling and then filtered. The filtered residue was washed with 35 ml. of hot water. Lithium was determined in the combined filtrate and wash water. One hundred and thirty mg. of lithium chloride were present which represented a recovery of 90 percent. The filtered residue was analyzed by X-ray diffraction and found to be chiefly bayerite (alpha-$Al_2O_3 \cdot 3H_2O$).

To show the effect of temperature on the conversion or recovery of lithium from lithium aluminate complex, a series of runs was made in a manner similar to that described above except that the temperature was varied. The results obtained are shown below.

| Temperature, ° C. | Time, min. | Pressure, p.s.i.g. | LiCl Dissolved, percent | Form of Al(OH)$_3$ |
| --- | --- | --- | --- | --- |
| 100-1 | 60 | 0-0.5 | 76 | bayerite. |
| 123-124 | 60 | 17-18 | 88-89 | Do. |
| 128-130 | 60 | 23-25 | 90-95 | Do. |
| 140 | 60 | 37-38 | 93-94 | Do. |
| 150 | 60 | 54-55 | 93 | Do. |
| 200 | 60 | 211 | 96-97 | boehmite. |

To show the effect of time, a series of runs was made at 128° to 130° C. where the time of digestion was varied from 30 minutes to 90 minutes. The results obtained are shown below.

| Time, Min. | Percent Recovery, LiCl | Form of Al(OH)$_3$ |
| --- | --- | --- |
| 30 | 89 | bayerite. |
| 60 | 90 | Do. |
| 90 | 91 | Do. |

Example II

An ion exchange column, 1.3 cm. in diameter and 66 cm. in height, was filled with 50 ml. (wet volume) of a sulfonic acid type cation exchange resin in the sodium form. The sulfonic acid type cation exchange resin used was similar to that disclosed in U.S. Patent Number 2,366,007 and similar to the resin sold by The Dow Chemical Company under the trademark of "Dowex-50." Eight hundred ml. of a synthetic feed solution containing 3.04 gm. of lithium chloride, 0.44 gm. of calcium chloride, and 0.22 gm. of boric acid were passed through the column at a flow rate of 4 ml. per minute. The resin was then washed with 200 ml. of wash water. The effluent from the resin was collected in 5 increments of 200 ml. each during the time the feed solution and the 200 ml.

of wash water were passed through the resin. These samples were analyzed for lithium chloride, sodium chloride, and calcium chloride. The results obtain are shown below:

| Sample No. | Mg. of LiCl in 200 ml. of sol. | Mg. of NaCl in 200 ml. of sol. | Mg. of CaCl$_2$ in 200 ml. of sol. |
|---|---|---|---|
| 1 | 0 | 0 | 0 |
| 2 | 0 | 1163 | 0 |
| 3 | 28.5 | 1125 | 0 |
| 4 | 247 | 821 | 0 |
| 5 | 16.8 | 43 | 0 |

After the resin was washed with the 200 ml. of water, it was then treated with 25 ml. of 3.98 N. sodium hydroxide and washed with an additional 90 ml. of water. During the addition of the sodium hydroxide and the final washing with 90 ml. of water, the effluent from the ion exchange resin was collected in increments of around 20 ml. each. These samples were analyzed for lithium hydroxide, sodium hydroxide, and calcium hydroxide.

The analysis of the particular samples taken are shown below.

| Sample No. | Mg. of LiOH in 20 ml. of sol. | Mg. of NaOH in 20 ml. of sol. | Mg. of Ca(OH)$_2$ in 20 ml. of sol. |
|---|---|---|---|
| 6 | 0 | 0 | 0 |
| 7 | 763 | 380 | 0 |
| 8 | 806 | 747 | 0 |
| 9 | 8.5 | 112 | 0 |
| 10 | 2.2 | 232 | 0 |
| 11 | 0 | 10 | 0 |

In samples number 7 and 8 91 weight percent of the lithium chloride was recovered as a lithium hydroxide solution containing 6.86 gm. of LiOH·H$_2$O per 100 ml. of solution.

What is claimed is:

1. A process for the recovery of lithium from a lithium aluminate complex precipiated from a chloride brine and containing as impurities calcium, magnesium, aluminum and ferric ions, which comprises heating the lithium aluminate complex to a temperature of at least 75° C. in the presence of liquid water to decompose the lithium aluminate complex to aluminum hydroxide, and a soluble lithium compound which dissolves in the water with the impurities contacting the resulting lithium containing solution with a strongly acidic cation exchange resin to thereby bind the lithium and the impurities to the resin, subsequently contacting the strongly acidic cation exchange resin with a caustic solution containing from 1 to 20 weight percent caustic to obtain lithium hydroxide in solution and the impurities as insoluble hydroxide precipitates, recovering the lithium hydroxide from the solution, and separating the resin from the precipitated impurities.

2. A process according to claim 1, wherein the lithium aluminate complex is heated to 100° to 155° C.

3. A process according to claim 1, wherein the lithium aluminate complex is heated to a temperature in the range of 120° to 130° C. for a length of time from 20 to 30 minutes.

4. A process for the recovery of lithium from a lithium aluminate complex precipitated from chloride brines and containing as impurities calcium, magnesium, aluminum and ferric ions, which comprises heating the lithium aluminate complex to a temperature of at least 75° C. in the presence of liquid water to decompose the lithium aluminate complex to aluminum hydroxide and a soluble lithium compound which dissolves in the water with the impurities, contacting the resulting lithium solution with a strongly basic quaternary ammonium type anion exchange resin to thereby convert the lithium in the solution to lithium hydroxide and the impurities to insoluble hydroxide precipitates, and separating the lithium as lithium hydroxide from the resin and the precipitated impurities.

References Cited in the file of this patent

UNITED STATES PATENTS

| 1,924,503 | Lambert | Aug. 29, 1933 |
| 1,943,786 | Cowles | Jan. 16, 1934 |
| 2,331,838 | Lindblad et al. | Oct. 12, 1943 |
| 2,606,098 | Bauman | Aug. 5, 1952 |

FOREIGN PATENTS

| 633,008 | Great Britain | Dec. 5, 1949 |

OTHER REFERENCES

Mellor: "Comprehensive Treatise on Inorganic and Theoretical Chemistry," Longmans, Green and Co., N.Y., vol. V, pp. 278, 286 and 287 (1924).

Horan et al.: "J. Am. Chem. Soc.," vol. 57, pages 2434–2436 (1935).

Kunin et al.: "Ion Exchange Resins," John Wiley and Sons, New York, pages 96, 97, 98 (1950).

Nachod et al.: "Ion Exchange Technology," 1956, Academic Press Inc., N.Y., page 294.